United States Patent [19]

Porter

[11] Patent Number: 4,515,034

[45] Date of Patent: May 7, 1985

[54] CONTROL MECHANISM FOR HYDRAULIC LOCKING DEVICE

[75] Inventor: Clyde R. Porter, Woodland Hills, Calif.

[73] Assignee: P. L. Porter Co., Woodland Hills, Calif.

[21] Appl. No.: 412,242

[22] Filed: Aug. 27, 1982

Related U.S. Application Data

[63] Continuation-in-part of Ser. No. 157,356, Jun. 9, 1980, Pat. No. 4,354,398.

[51] Int. Cl.³ .............................................. F16C 1/10
[52] U.S. Cl. ........................... 74/501 R; 24/132 WL; 24/541; 24/658
[58] Field of Search .................. 74/501 R, 501.5, 502; 24/652, 656, 658, 540, 541, 535, 536, 538, 132 WL; 403/155

[56] References Cited

U.S. PATENT DOCUMENTS

| | | | |
|---|---|---|---|
| 1,055,440 | 3/1913 | Boden | 24/658 |
| 1,986,232 | 1/1935 | Weatherhead, Jr. | 74/502 |
| 2,240,138 | 4/1941 | Johns | 24/211 R |
| 2,536,202 | 1/1951 | Meyer | 24/538 |
| 3,553,967 | 1/1971 | Porter et al. | 60/54.5 |
| 3,730,019 | 5/1973 | Ballard | 74/502 |
| 3,984,191 | 10/1976 | Doty | 403/155 |
| 4,324,125 | 4/1982 | Jarman et al. | 24/536 |
| 4,331,041 | 5/1982 | Bennett | 74/501.5 R |
| 4,354,398 | 10/1982 | Porter | 74/501 R |

FOREIGN PATENT DOCUMENTS

| 4617 | of 1894 | United Kingdom | 24/132 WL |
| 1288840 | 9/1972 | United Kingdom | 403/155 |

Primary Examiner—Kenneth J. Dorner
Attorney, Agent, or Firm—Beehler, Pavitt, Siegemund, Jagger & Martella

[57] ABSTRACT

An improved cable control mechanism for releasing a hydraulic locking device by an operator from a remote location is provided with a clamping mechanism for quickly attaching one end at the control cable to the output lever assembly at the proper point for reliable operation of the device without prior measurement of the cable length. The clamping lever also covers the sharp free end of the cable to avoid injury to maintenance personnel. Other improvements disclosed include separate retaining clips for more conveniently mounting the output lever assembly to the locking device and for attaching the cable conduit to the output lever assembly.

6 Claims, 4 Drawing Figures

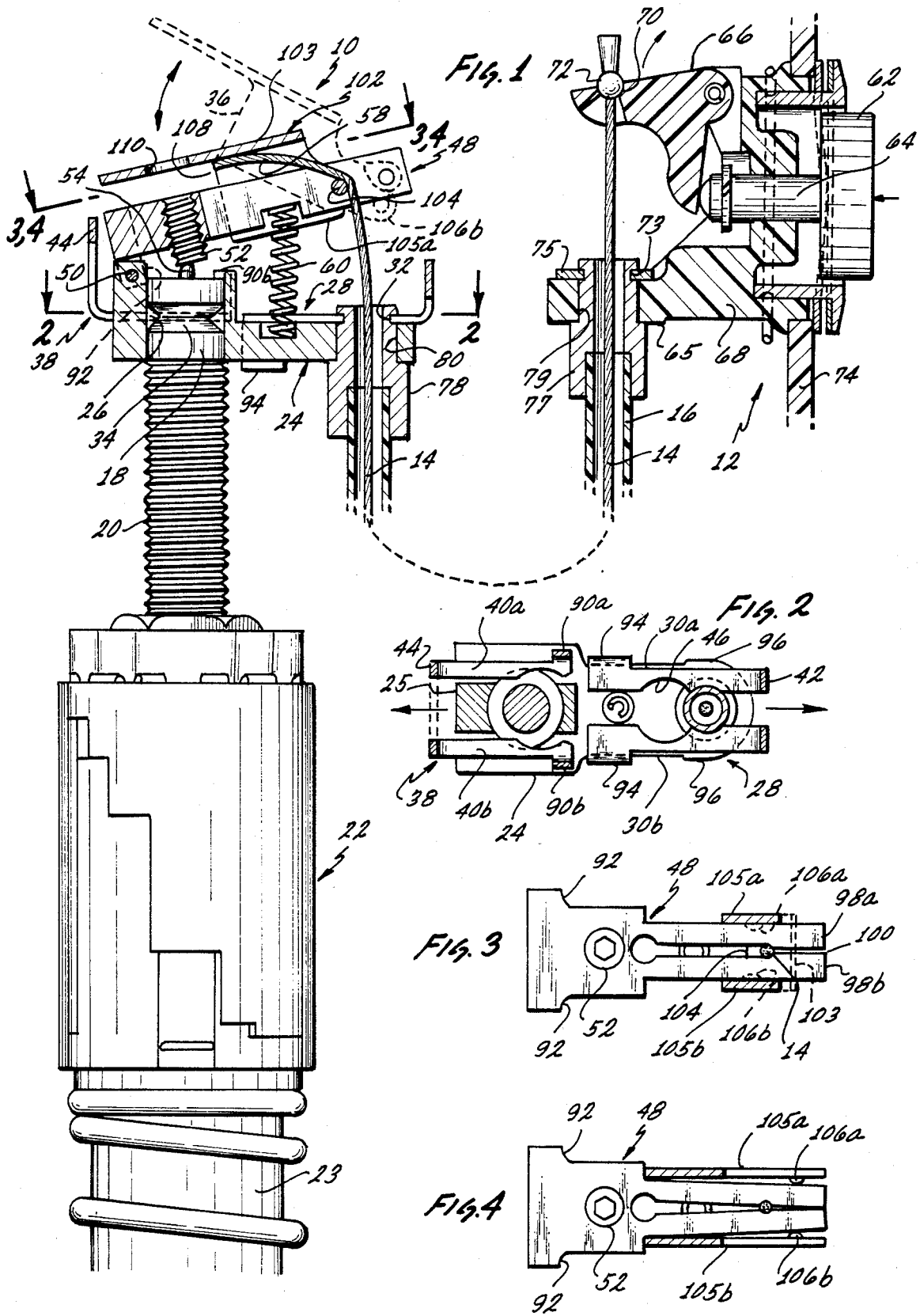

CONTROL MECHANISM FOR HYDRAULIC LOCKING DEVICE

RELATED APPLICATIONS

This is a continuation-in-part of U.S. patent application, Ser. No. 157,356, filed June 9, 1980, now U.S. Pat. No. 4,354,398.

BACKGROUND OF THE INVENTION

1. Field of the Invention

The present invention pertains to the field of hydraulic locking devices and more specifically is an improved, more easily adjustable cable control mechanism for releasing a hydraulic locking device by an operator from a remote location.

2. State of the Prior Art

Hydraulic locking devices have been widely used for controlling the spacing between two members. In one exemplary application, the hydraulic locking device is used for controlling the inclination of a tiltable back rest of a reclining seat in aircraft and other vehicles. This use of the device is described in U.S. Pat. No. 2,522,246 for RECLINING CHAIR, issued to Armstrong Sept. 12, 1950.

Typically such hydraulic locking devices include a hydraulic cylinder connected to one of the members, a hollow piston rod extending through one end of the hydraulic cylinder and connected to the other of the two members, and an operating rod extending coaxially within the hollow piston rod and protruding beyond the exposed end of the piston rod, and operative when pushed into the piston rod to a release position to release the hydraulic locking device so it can be reset to alter the separation between the two members.

Contemporary locking devices are disclosed in U.S. Pat. No. 3,760,911 for HYDRAULIC LOCKING DEVICE, issued to Porter et al Sept. 25, 1973 and in U.S. Pat. No. 3,860,098 for HYDRAULIC LOCKING DEVICE, issued to Porter et al Jan. 14, 1975. The devices described in these patents are sold under the name HYDROLOK, a registered trademark of the P. L. Porter Company of Woodland Hills, Calif., to whom the aforementioned patents have been assigned. The subject matter disclosed in the above patents is hereby incorporated into the present disclosure by this reference.

A hydraulic control assembly is disclosed in U.S. Pat. No. 3,553,967 for HYDRAULIC CONTROL ASSEMBLY, issued to Porter et al Jan. 12, 1971 and in U.S. Pat. No. Re. 28,030 for HYDRAULIC CONTROL ASSEMBLY to Porter et al, issued June 4, 1974. The hydraulic control assembly disclosed in these patents includes a push button operable by a passenger in a vehicle to release the hydraulic locking device so that he can adjust the tilt of the back of his seat. The push button includes a plunger which presses against a diaphragm to cause a hydraulic pressure, which pressure is then transmitted through a tube to a movable wall or diaphragm which controls the release of the locking device. In contrast to the hydraulic control assembly, the present invention relates to a mechanical control assembly in which the forces are transmitted by a cable instead of through a tube filled with hydraulic fluid. The present invention thus relates to a control mechanism which attaches to the locking device to permit an operator to trip the release mechanism of the hydraulic locking device from a remote and more comfortable position. The hydraulic locking device in itself is not the subject of the present invention, but only the control mechanism.

Because the hydraulic locking devices are frequently used to control the tilt of the back of the seat in a vehicle, the hydraulic locking devices are normally positioned under the seat to prevent tampering and for aesthetic reasons. Accordingly, the control mechanism must be rugged and reliable, easy to mount to the hydraulic locking device, and easy to adjust. It is desirable that the placement and adjustment of the control mechanism should be accomplished without removing the hydraulic locking device from the seat and without removing the seat from service for more than a minimal amount of time. The control mechanisms of the prior art suffered from various shortcomings, particularly in that the manner of attachment of the mechanism to the hydraulic locking device required tools which were difficult to use in the cramped quarters and poor illumination typical of the environment where the devices are used. In addition it was difficult to adjust the end points of the stroke of the cable; i.e., to trim the cable to the proper length relative to the length of the conduit through the which the cable passes.

Applicant's copending patent application Ser. No. 157,356 and assigned to the same assignee as this application provides a partial solution to the shortcomings of the prior art. The control mechanism disclosed therein requires no tooling for attachment to the piston rod of the hydraulic locking device. The lever assembly is provided with a single slidable spring clip which serves the dual purpose of retaining the proximal end of the cable conduit to the lever assembly as well as securing the lever assembly to the exposed end of the piston rod. "The lever assembly" as used in the present specification refers to the portion of the control mechanism which is attached to the piston rod. The lever assembly is attached to the hydraulic locking device simply by inserting the tip of the piston rod through a hole in the lever assembly, and sliding the spring clip into engagement with a circumferential groove formed near the end of the piston rod.

The lever assembly is actuated by a cable which is drawn through a conduit under control of an operator. The operator is provided with a push button assembly which includes a crank which draws the cable through the conduit when a push button is pressed. The proximal end of the cable engages the lever assembly and the distal end of the cable engages the crank. The distal end is provided with a metallic ball or bead threaded or swaged to the cable and which may be also crimped in place. The larger size of the ball prevents the distal end from being pulled through the socket in the crank upon which it bears, thereby securing the cable to the crank.

When the cable is drawn through the conduit in response to the remote push button control unit being pressed by an operator, the output lever is pivoted relative to the mounting base and in so doing, the output lever pushes the operating rod into the piston rod releasing the hydraulic locking device. A compression spring such as a helical spring positioned between the output lever and mounting base returns the output lever to its original position when the push button is released. The proximal end of the control cable was provided with a second, proximal metallic ball or bead affixed to the cable for engaging the output lever. The effective length of the control cable was therefore determined by the distance between the two balls measured along the cable. The placement of the proximal ball was relatively critical, even allowing for the modest cable length adjustment capabilities provided in the lever assembly. Further, the proximal end of the conduit was affixed to the lever assembly by means of a washer and a snap ring and a threaded collar was provided for adjusting the length of the conduit relative to the cable length measured between the proximal and distal balls. These considerations made it desirable to attach the cable and conduit to the output lever assembly at the factory, so that the control mechanism was supplied to the installer as a unit including the lever assembly and the push button unit interconnected by the control cable and conduit. In the cramped environments where these devices are typically installed adjustment of the cable length by means of previously used threaded collars was found to be inconvenient and difficult. It is highly advantageous to remove broken or damaged stranded cable from the conduit without removal of the conduit which extends through difficult routing in the seat arm and seat bottom with cast or swaged balls on both ends of the cable, removal and reinsertion of replacement cable is impossible. A means to eliminate the adjustment collar and clamp A cable without precision fitting is desirable. The range of adjustment to the cable length possible with a threaded collar is limited by the length of the collar itself. It was necessary therefore to make a fairly close initial approximation of the required cable length when the proximal and distal balls were affixed to the cable. The threaded collar could then be used to make the final adjustments.

SUMMARY OF THE INVENTION

The present invention improves over the device of applicant's copending application as well as other prior art by providing separate first and second clips for independently engaging the piston rod and cable conduit, respectively. This removes the need for the additional washer and snap ring, and allows the lever assembly to be supplied detached from the conduit. As a result, the lever assembly may be more easily mounted to the piston rod without having to cope with an attached, relatively stiff control cable and conduit. This was not previously possible because the snap ring securing the proximal end of the conduit to the lever assembly is not readily attachable unless a special tool is used, and this attachment is best done at the factory to eliminate fumbling with small, difficult parts during installation of the unit in the field, under usually adverse conditions.

In the present invention the cable length is made essentially self adjusting and the ease of installation and adjustment is further enhanced in that the proximal end of the cable is secured to the lever assembly by means of a novel clamping mechanism which permits easy adjustment of the cable length and at the same time retracts the sharp ends of the cable into a protected space so as to prevent injury to personnel servicing the unit. The cable typically used for the control linkage is a multiwire steel cable which often has sharp ends capable of cutting the hands of personnel working on the unit.

In the present invention the proximal end of the cable readily slips through a slot in the clamping arrangement when the conduit is attached to the lever assembly and the cable may be affixed to the output lever at any point along its length. Thus it is possible to start with any arbitrary length of cable provided with a single ball for engaging the crank of the push button unit, clamp the cable at the desired proximal point and then cut off any excess length without need to affix a metallic ball at a critical point and make fine adjustments with a difficult to turn threaded collar.

The distal end of the conduit through which the cable slides is attached to the push button assembly, which is in turn mounted at a convenient location on the adjustable seat. The length of the cable as defined by the ball swaged to the distal end and the clamping point at the proximal end of the cable, must be such that the range of movement of the end of the cable at the push button is within the range of movement of the crank portion of the push button. However, according to the present invention, the length of the cable is substantially self adjusting at the lever assembly because of the clamping arrangement and thus it is not necessary to determine the length of the cable relative to the conduit with any degree of precision prior to undertaking installation of the control mechanism.

In a preferred embodiment both ends of the conduit are terminated with sleeves provided with circumferential grooves engageable by retaining clips or snap rings provided at the push button unit and lever assembly. The proximal end of the conduit is inserted through a bore in the lever assembly mounting base so that the terminal sleeve and circumferential groove formed therein protrudes beyond the shoulder adjacent the bore. Preferably a clip slidable relative to the mounting base of the lever assembly is provided for engaging the circumferential groove of the proximal terminal sleeve of the conduit so as to retain the sleeve within the bore. Desirably the terminal sleeve is retained rotatably within said bore. The sliding clip may be mounted so as to be secured to the mounting base of the lever assembly against easy separation therefrom so that the clip is not lost and is always available as part of the lever assembly when installation is carried out. The opposite, distal end of the conduit is likewise provided with a terminal sleeve having a circumferential groove formed therein. The distal sleeve is passed through a bore in a flange provided in the frame of the push button unit. A snap ring may be inserted about the circumferential groove for retaining the conduit at its distal end to the push button assembly. It is preferred that the distal terminal sleeve also be rotatable relative to the push button unit. The snap ring is not readily removable without use of tools and thus it is contemplated that the conduit will be supplied already attached to the push button control unit. The proximal end of the conduit, however can be quickly attached to the lever assembly without tools, by means of a second slidable clip also secured to the mounting base of the lever assembly, independently of the first clip engageable with the piston rod.

In a preferred embodiment of the present invention, the lever assembly includes a mounting base which is fastened to the end of the piston rod of the hydraulic locking device by the sliding clip described above, and further includes an output lever pivotably mounted to the mounting base and provided with a clamping lever for securely fastening the proximal end of the control cable at a continuously selectable point to the output lever to thereby adjust the length of the cable. The clamping lever is movable between a release position and a locked position and is so constructed as to bend and retract the free proximal end of the control cable into a protected space between the clamp lever and the output lever to avoid injury to service personnel. The output lever is slotted along its length to define a pair of parallel fingers between which the proximal end of the cable is inserted. The cable is merely inserted through the slot and the proximal end of the conduit is secured by means of the second clip. At this stage of assembly the cable may be pulled lightly at the proximal end to remove slack in the control system whereupon the cable will have been adjusted to the desired length between the output lever and the push button control unit. The cable is then secured simply by moving the clamp lever from a release position to a locking position in which the parallel fingers of the output lever are clamped together to secure therebetween the cable against further sliding movement through the slot. In a preferred embodiment of the invention the clamping lever when in its locked position is generally parallel to the output lever but spaced therefrom to define an inner space. The free end of the control cable is carried by the clamping lever when the lever is moved to its locked position such that the free end of the cable is bent over a pivot pin extending through the slot and securing the clamp lever to the output lever. The sharp free end of the cable is thus enclosed in the aforementioned inner space wherein it is largely inaccessible so as to avoid possible injury to maintenance personnel.

A further adjustment useful for setting the stroke of the output lever independently of the cable length adjustment is provided and may be in the form of a set screw threaded through the output lever and extending therethrough to make contact with the control rod when the output lever is actuated. By adjusting the set screw, the stroke length may be increased or decreased without otherwise affecting the tension or the setting of the cable length.

The novel features which are believed to be characteristic of the invention both as to its structure and its operation, along with further objects and advantages thereof, will be better understood from the following description considered in connection with the accompanying drawings, in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a cross sectional view of a preferred embodiment of the control mechanism of the present invention;

FIG. 2 is a section taken along line 2—2 in FIG. 1 showing the first and second clips for retaining the piston rod and the cable conduit, respectively;

FIG. 3 is a section taken along line 3—3 in FIG. 1 with the clamping lever in its release position; and FIG. 4 is a section taken along line 4—4 of FIG. 1 showing the cable clamped to the output lever.

DETAILED DESCRIPTION OF THE PREFERRED EMBODIMENT

With reference to the drawings generally a preferred embodiment of the control mechanism of this invention includes a lever assembly 10 and a push button assembly 12. The push button assembly is connected to the lever assembly 10 by a cable 14 which extends through a conduit 16. The end of the conduit that is connected to the lever assembly is referred to as the proximal end while the end that is connected to the push button assembly is referred to as the distal end. The lever assembly 10 is attached to the end portion 18 of the piston rod 20 of the hydraulic locking device 22, which includes a hydraulic cylinder 23.

As best seen in FIGS. 1 and 2, the lever assembly 10 includes a mounting base 24 through which extends a first bore or hole 26. The end portion 18 of the piston rod 20 is inserted through the hole 26, and the mounting base 24 is fastened to the piston rod 20 by a first slidable spring clip 38, also shown in FIG. 2. The spring clip 38 includes two arms 40a and 40b which engage opposite sides of a groove 34 which extends circumferentially around the end portion 18 of the piston rod 20 to prevent the mount 24 from moving in either axial direction relative to the piston rod but to permit the lever assembly to rotate on the piston rod about the axis 36. A post 25 extends upwardly from the mount 24 between the two arms of the spring clip 38 such that the spring clip is guided in sliding displacement in a direction parallel to the two arms as indicated by the left arrow in FIG. 2. The lever assembly 10 further includes an output lever 48 pivotally connected to the upper end of the post 25 by a pin 50.

The spring clip 38 is retained by a pair of upwardly extending tabs 90a and 90b which abut against a rear portion 92, best seen in FIGS. 3 and 4, of the output lever of enlarged width which limit the outward sliding movement of the spring clip 38 to prevent the spring clip from becoming separated from the lever assembly 10 and lost.

As normally supplied the lever assembly 10 includes not only the first clip 38 for mounting the lever assembly to the piston rod but also a second spring clip 28 slidably mounted to the mounting base 24 by means of a pair of retaining members 94 which closely embrace the sides and underside of the mount 24 to guide the clip 28 in its sliding displacement as indicated by the right arrow in FIG. 2. The retaining members 94, however, also retain the clip 28 to the base by abutting against an enlarged end portion 96 of the mounting base best seen in FIG. 2. As shown in FIG. 2 the spring clip 28 also includes two arms 30a and 30b which define an enlarged cutout area 46 dimensioned to snap into and engage a circumferential groove 32 formed in the terminal sleeve 78 of the cable conduit 16.

The output lever further includes a set screw 52 which preferably is a set screw threaded through the output lever so as to contact the end of the operating rod 54 to push it into the piston rod 20 to thereby release the hydraulic locking device 22. As best appreciated in FIGS. 3 and 4 the output lever 48 includes two normally parallel fingers 98a and 98b separated by slot 100.

A clamping lever 102 includes an upper portion 103 affixed between two lateral portions 105a and 105b which extend downwardly on either side of the output lever 48, the clamping lever 102 is pivotally mounted to the output lever 48 by means of a pin 104 which extends through the parallel fingers 98a, 98b and the slot 100. A pair of inwardly projecting dimples 106a and 106b are formed on the lateral portions 105a and 105b respectively. When the clamping lever is pivoted down from its cable release position to its locking position, i.e., from the phantom position to the solid line position in FIG. 1, the dimples are forced over the sides of the output lever fingers 98a and 98b, exerting inward force on each of the fingers which are thus urged together, narrowing the slot 100 to clamp the control cable 14 between the two fingers, as best seen in FIG. 4. For this purpose the output lever is made of a material such as metal having sufficient resiliency to cause the two fingers to separate and return to their normally parallel relationship when the clamp lever is moved to its release position.

The clamping lever is mounted to the output lever in such a manner that when the conduit 16 is attached to the lever assembly the free end 58 of the control cable 14 will normally extend upwardly through the slot 100 in the output lever between the clamp lever pivot pin 104 and the clamping lever 102. Thus when the clamp lever is pivoted to its locked position the excess length of the cable will be received between the lateral portions 105a, 105b and the upper portion 103 will bend the excess length of the cable 14 over the pin 104 as shown in solid lines in FIG. 1 such that the sharp free end of the cable is enclosed in a space 108 defined between the clamping lever 102 and the output lever 48 and partially enclosed along the sides by the downwardly projecting lateral portions 105a and 105b of the clamping lever 102. The upper portion 103 of the clamping lever 102 may be perforated with a hole 110 for allowing access to the set screw 52 with a hex wrench or other appropriate tool in order to adjust the stroke of the output lever 48. The stroke of the output lever 48 is adjustable by means of the set screw 52 independently from any previously or subsequently made adjustment to the length of the cable 14.

The output lever 48 is a lever of the third class and is used to provide a mechanical advantage so that the force exerted on the operating rod 54 is appreciably greater than the tension in the cable 14. A return spring 60 is mounted between the output lever 48 and the mounting base 24 and urges them apart so that the output lever 48 will be returned to its initial spaced position when the push button 62 is released.

The push button assembly 12 is connected to the conduit 16 and engages the cable 14. The push button assembly 12 includes the push button 62, a plunger 64, a crank 66 and a frame 68. The distal end of the conduit 16 is provided with a terminal sleeve 77 which is inserted through a bore 79 in the flange 65 of the frame. The sleeve 77 may be retained to the flange 65 by a snap ring 75 which engages the circumferential groove 73 in the terminal sleeve. The crank 66 is pivotably mounted to the frame 68 and includes a socket 70 for retaining a ball 72 which is swaged to the distal end of the cable 14. When the push button 62 is moved in the direction indicated, the plunger 64 pushes the crank 66 to pivot in the direction shown, drawing the cable 14 in the direction indicated. In one embodiment, the push button assembly 12 is mounted to a portion 74 of the arm of a seat (not shown and thus is located remotely from the lever assembly 10 and the hydraulic locking device 22.

From the above discussion of the push button assembly 12, it is clear that as the push button 62 is pressed, the socket 70 is moved through a range of positions. If the control mechanism is to function properly, the ball 72 must be positioned along the cable 14 at the particular location which will permit the ball 72 to remain seated in the socket 70 as the crank 66 pivots. In order to accomplish this it is necessary to provide easy adjustment means for setting the effective cable length which problem is solved by the cable clamping means provided on the output lever 48.

Installation of the lever assembly is preferably carried out by first mounting the lever assembly 10 to the hydraulic locking device 22 by inserting the end portion 18 of the piston rod through the hole 26 and pushing the first spring clip 38 by its upturned end 44 so as to lockingly engage the circumferential groove 34 in the piston rod. The terminal sleeve 78 of the cable conduit 16 may then be inserted through the second bore 80 formed in the mounting base 24 of the lever assembly, grasping the second spring clip 28 by its upturned end 42 and sliding the spring clip into engagement with the circumferential groove 32 formed in the terminal sleeve 78 of the cable conduit. This will normally leave a length 58 including the free end of the control cable 14 exposed and extending upwardly through the base 24 in the general direction of the output lever 48. Thus, it is seen that installation of the control mechanism is accomplished without the use of tools and by simply pushing the first and second spring clips 28 and 38 towards each other into locking engagement with circumferential grooves formed in the cable conduit and piston rod respectively.

The control device is adjusted by first allowing the crank 66 to drop to its lowermost extreme of pivotal movement which corresponds with a withdrawn position of the push button 62 relative to the frame 68 approximately as shown in FIG. 1. This may be achieved by simply pulling on the free proximal end 58 of the cable as it extends upwardly through the open slot 100 in the output lever. This removes any free play in the push button control mechanism 12 as well as tensioning and removing slack from the control cable 14 within the conduit 16. The output lever is allowed to rest in its fully spaced position relative to the mounting base 24 under the urging of the return spring 60. The clamping lever 102 may then be pivoted, without depressing the output lever, from its release position to the locked position thereby clamping the cable 14 between the fingers of the output lever and simultaneously, in one simple stroke, bending the exposed free proximal end of the control cable into a protected space shrouded by the clamping and output levers to avoid injury to personnel by the sharp end of the cable. If desired, a preliminary adjustment of the stroke of the output lever 48 may be made by depressing the output lever partially through its stroke prior to clamping the cable 14. The clamp will prevent the output lever from returning to the upper limit of its stroke because the cable cannot be drawn further from the conduit 16 at this stage. An additional, fine adjustement of the stroke of the output lever may then be made by means of the set screw 52 without altering the initial setting of the crank 66, the position of the push button 62 relative to the frame 68, the effective length of the cable 14 relative to the conduit 16, nor the tension of the return spring 60. The set screw 52 may be extended towards the control rod 54 so as to shorten the stroke of the output lever required for contact with the control rod to thereby obtain a positive immediate unlocking of the hydraulic lock 22 upon pressing the push button 62. The control mechanism may be easily adjusted so that the push button 62 need not be depressed through its full available stroke in order to obtain unlocking of the hydraulic lock 22. Not only is quick response generally desirable, but this feature is particularly useful in that after prolonged use the control cable may stretch somewhat or it may be pulled slightly through the clamping mechanism on the output lever so that the effective length of the control cable is slightly lengthened. This reserve stroke distance allows effective operation of the control linkage without readjustment of the cable length in spite of a slight lengthening of the control cable.

If during assembly of the control mechanism, the length of the cable between the ball 72 and the clamping point at the output lever 48 is appreciably too long, the push button 62 may bottom out against the frame 68 before the output lever has reached the end of its desired stroke. In such a situation the output lever may not be moved sufficiently to push the operating rod 54 to the release position. On the other hand, if the length of the cable 14 included between the ball 72 and the clamping point is appreciably too short, it may be impossible for the output lever 48 to move sufficiently far away from the mount 24 to permit the operating rod 54 from emerging from the piston rod 20, thereby preventing the hydraulic locking device from completely locking. Both of the situations are easily remedied during assembly of the control mechanism by use of the adjustment capability provided by one or both of the clamping arrangement and the set screw of the output lever 48.

The foregoing detailed description is illustrative of a preferred embodiment of the invention, and it is to be understood that additional embodiments thereof will be obvious to those skilled in the art. These additional embodiments are considered to be within the scope of the invention, which is limited only by the scope of the following claims.

What is claimed is:

1. A control mechanism for use with a hydraulic device employed to control relative movement between two members, said hydraulic device including a hydraulic locking device including a hydraulic cylinder connected to one of the members, a piston rod extending outwardly through one end of the hydraulic cylinder and terminating in an exposed end of the piston rod and connected to the other of the two members, and an operating rod operative when moved to a release position with respect to the piston rod to release the hydraulic locking device to thereby allow relative movement between the two members, said control mechanism comprising in combination:

a conduit having a proximal end associated with the piston rod and having a distal end;
   a cable extending through said conduit, slidable within it and including a proximal end and a distal;
   push button means affixed to the distal end of said conduit for moving said cable under control of an operator through a stroke with respect to said conduit;
   a mounting base;
   retaining means mounted to said base for engaging said piston rod and said pivotal conduit end respectively;
   output lever means pivotably mounted to said mounting base and responsive to movement of said cable to move the operating rod to the release position with respect to the piston rod;
   said output lever means having pair of normally parallel fingers and clamp means manually movable between a release position in which said cable is movable through said clamp means and a locked position in which the cable is clamped between said fingers at an arbitrary continuously selectable point along its length to said output lever.

2. The control mechanism of claim 1 further comprising:
   means for setting the stroke of said output lever means independently of said cable clamping means whereby the stroke of said output lever means may be adjusted without affecting the cable length.

3. The control mechanism of claim 1 wherein said retaining means comprise first and second clips independently slidable towards each other with respect to said base for independently engaging said piston rod and said proximal conduit end, respectively, said clips being movable away from each other to a release position, each clip being provided with means for preventing detachment of the clip from said mounting base in said release position.

4. The control mechanism of claim 1 wherein said pair of normally parallel fingers is integral with said output lever means and separated by a slot through which passes said cable, and clamp lever means pivotably movable between a release position and a locked position, said clamp lever means urging said fingers together to clamp said cable therebetween in said locked position, said clamp lever means defining with said output lever means an enclosure for the excess length of said cable.

5. The control mechanism of claim 1 or claim 4 wherein said clamp means upon being moved to said locked position bend the free proximal end of said cable into a substantially enclosed space to prevent injury to maintenance personnel.

6. A control mechanism for use with a hydraulic device employed to control relative movement between two members, said hydraulic device including a hydraulic locking device including a hydraulic cylinder connected to one of the members, a piston rod extending outwardly through one end of the hydraulic cylinder and terminating in an exposed end of the piston rod and connected to the other of the two members, and an operating rod operative when moved to a release position with respect to the piston rod to release the hydraulic locking device to thereby allow relative movement between the two members, said control mechanism comprising in combination:

a conduit having a proximal end associated with the piston rod and having a distal end;
   a cable extending through said conduit, slidable within it and including a proximal end and a distal end;
   push button means affixed to the distal end of said conduit for moving said cable under control of an operator through a stroke with respect to said conduit;
   a mounting base apertured for receiving said piston rod and said proximal end of said conduit;
   first and second clip means slidably and non-removably mounted to said base for independently engaging said piston rod and said proximal conduit end respectively;
   output lever means pivotably mounted to said base and responsive to movement of said cable to move the operating rod to the release position with respect to the piston rod;
   clamp means manually movable between a release position in which said cable is movable through said clamp means and a locked position in which the cable is clamped to said output lever at an arbitrary continuously selectable point along its length to said output lever, said clamp means upon being moved to said locked position also defining an enclosure with said output lever for enclosing the free proximal end of said cable to prevent injury to maintenance personnel; and
   means for setting the stroke of said output lever means independently of said cable clamping means whereby the stroke of said output lever means may be adjusted without affecting the cable length.

* * * * *